United States Patent
Kaplan

(10) Patent No.: US 10,816,746 B2
(45) Date of Patent: Oct. 27, 2020

(54) FIBER TAP OPTICAL CROSS CONNECT TERMINAL CLOSURE AND TERMINAL SPLICE CLOSURE

(71) Applicant: MULTILINK INC., Elyria, OH (US)

(72) Inventor: Steven E. Kaplan, Elyria, OH (US)

( * ) Notice: Subject to any disclaimer, the term of this patent is extended or adjusted under 35 U.S.C. 154(b) by 0 days.

(21) Appl. No.: 15/849,484

(22) Filed: Dec. 20, 2017

(65) Prior Publication Data

US 2018/0172940 A1    Jun. 21, 2018

Related U.S. Application Data

(60) Provisional application No. 62/436,859, filed on Dec. 20, 2016.

(51) Int. Cl.
    *G02B 6/44*    (2006.01)
(52) U.S. Cl.
    CPC .......... *G02B 6/4454* (2013.01); *G02B 6/445* (2013.01); *G02B 6/4471* (2013.01); *G02B 6/4451* (2013.01)
(58) Field of Classification Search
    CPC .................................................. G02B 6/4454
    See application file for complete search history.

(56) References Cited

U.S. PATENT DOCUMENTS

| | | |
|---|---|---|
| 2004/0161217 A1 | 8/2004 | Hodge et al. |
| 2006/0098932 A1 | 5/2006 | Battey et al. |
| 2006/0153517 A1* | 7/2006 | Reagan ................ G02B 6/3897 385/135 |
| 2006/0222309 A1* | 10/2006 | Grubish ................ G02B 6/445 385/135 |
| 2007/0189694 A1 | 8/2007 | Mullaney et al. |
| 2009/0148118 A1 | 6/2009 | Gronvall et al. |

OTHER PUBLICATIONS

PCT/US2017/067730 International Search and Written Opinion, dated Feb. 23, 2018.

* cited by examiner

*Primary Examiner* — Sung H Pak
*Assistant Examiner* — Hoang Q. Tran
(74) *Attorney, Agent, or Firm* — Fay Sharpe LLP

(57) ABSTRACT

A fiber optic closure assembly includes a base having an opening for receiving an incoming fiber optic cable along a longitudinal axis. A perimeter shoulder extending outwardly from a substantially planar surface of the base. A housing is dimensioned for receipt on the base and has a cover that when joined to the base encloses a cavity. The housing includes a substantially planar wall with at least one opening therethrough parallel to the longitudinal axis and through which an associated bulkhead may be mounted to provide operative communication between an optical fiber operatively connected to the incoming fiber optic cable and an outgoing drop line.

12 Claims, 9 Drawing Sheets

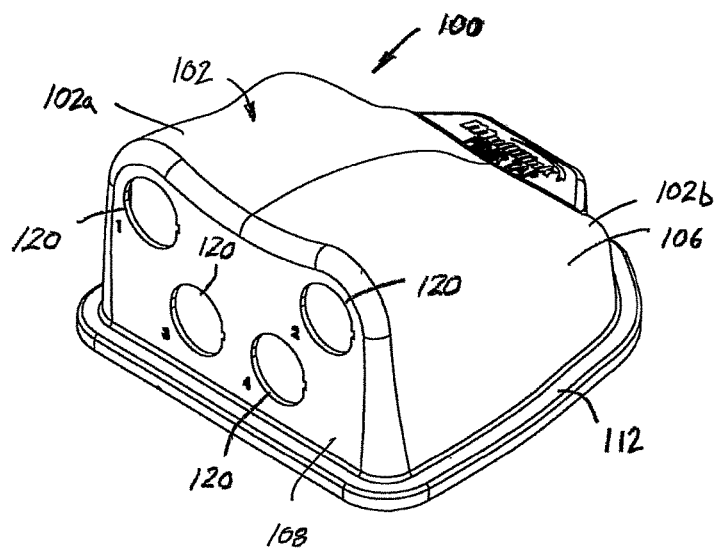
FIG. 1
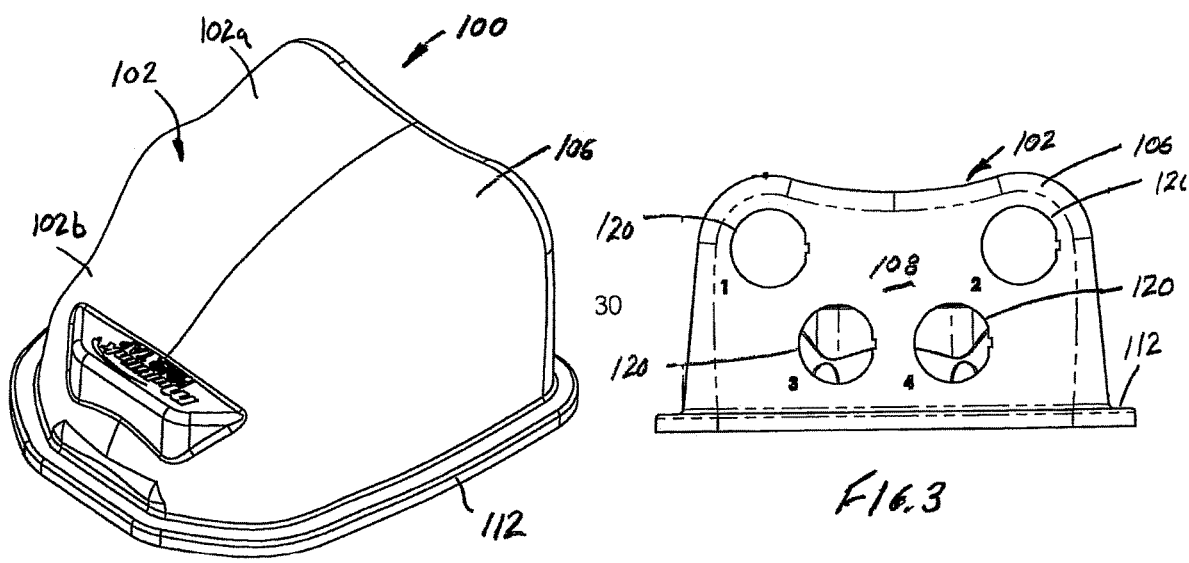
FIG. 2
FIG. 3

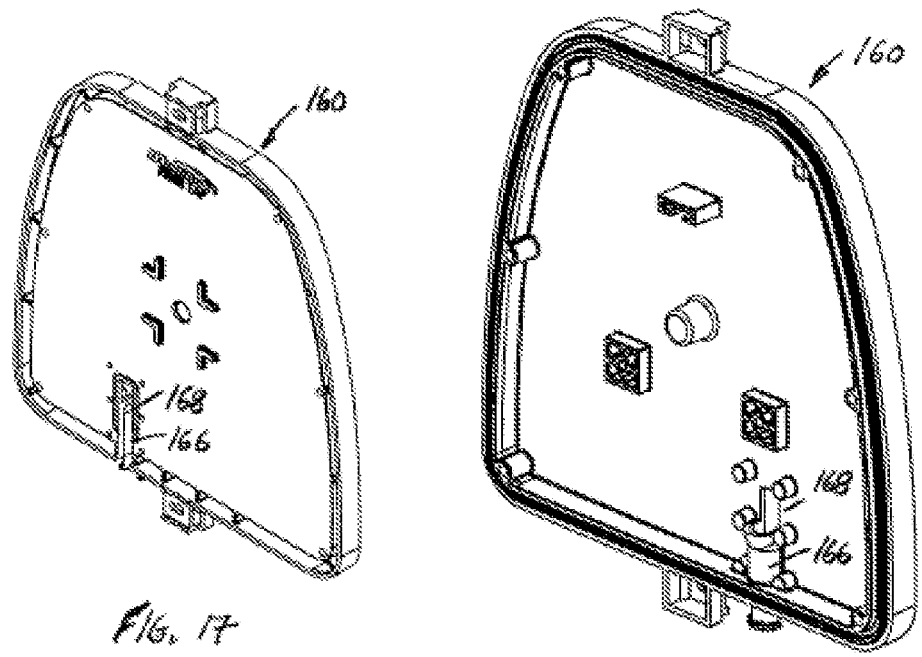
FIG. 17
FIG. 18
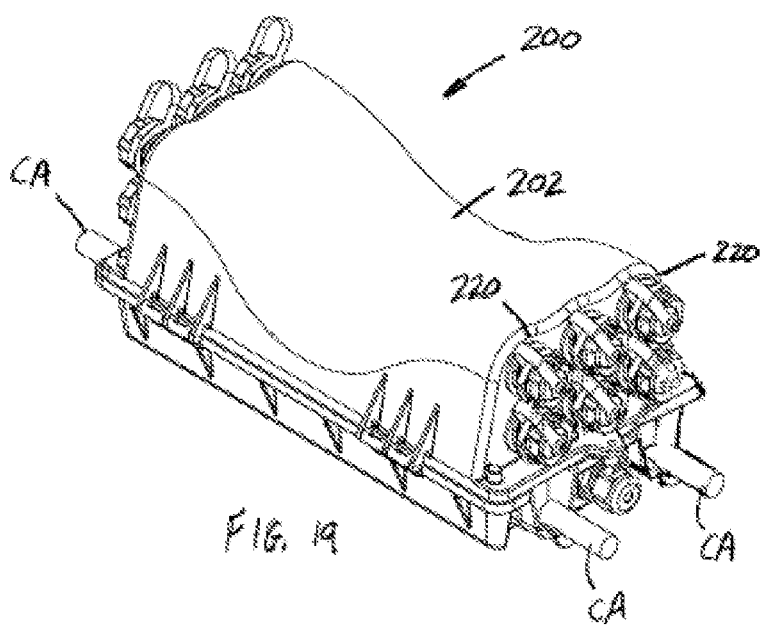
FIG. 19

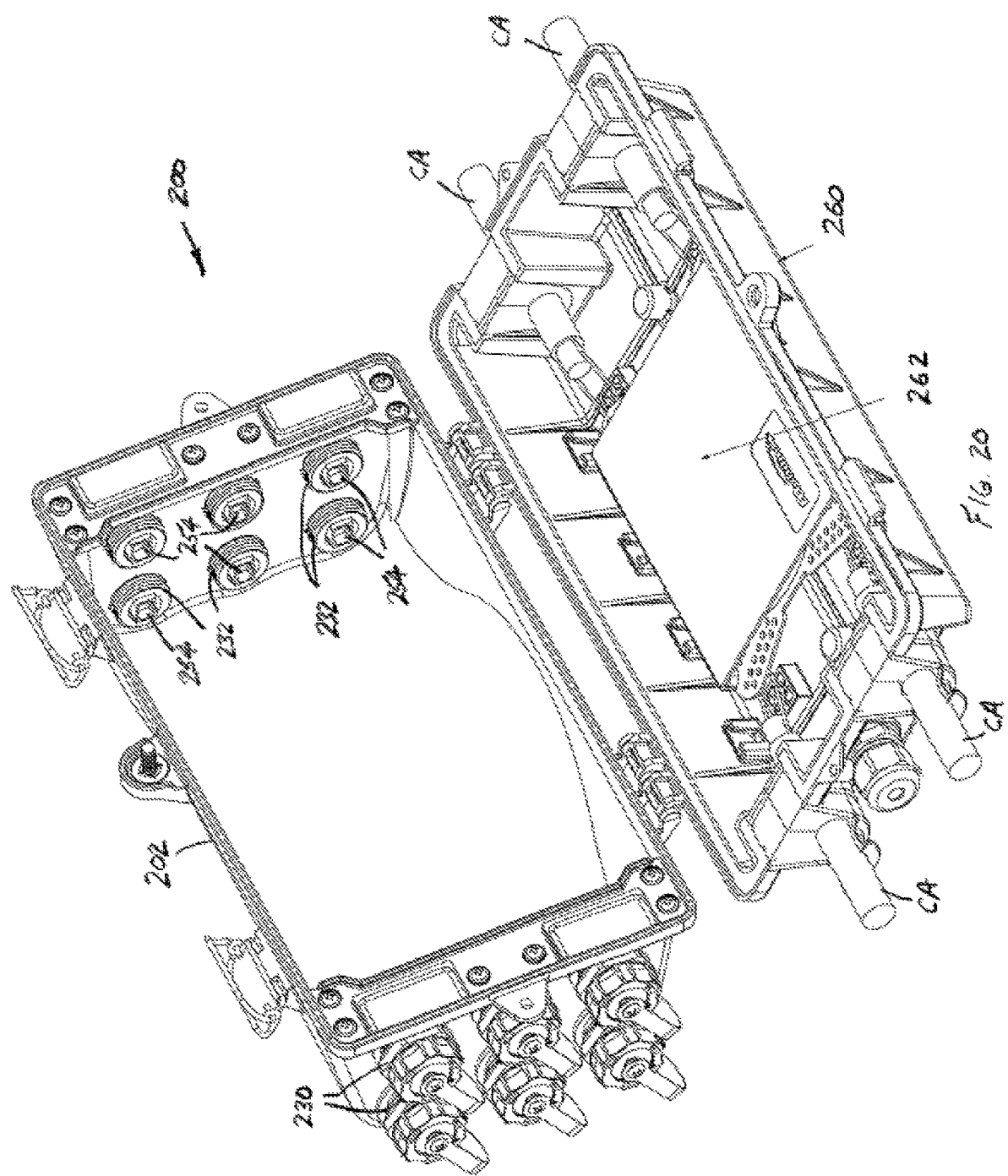

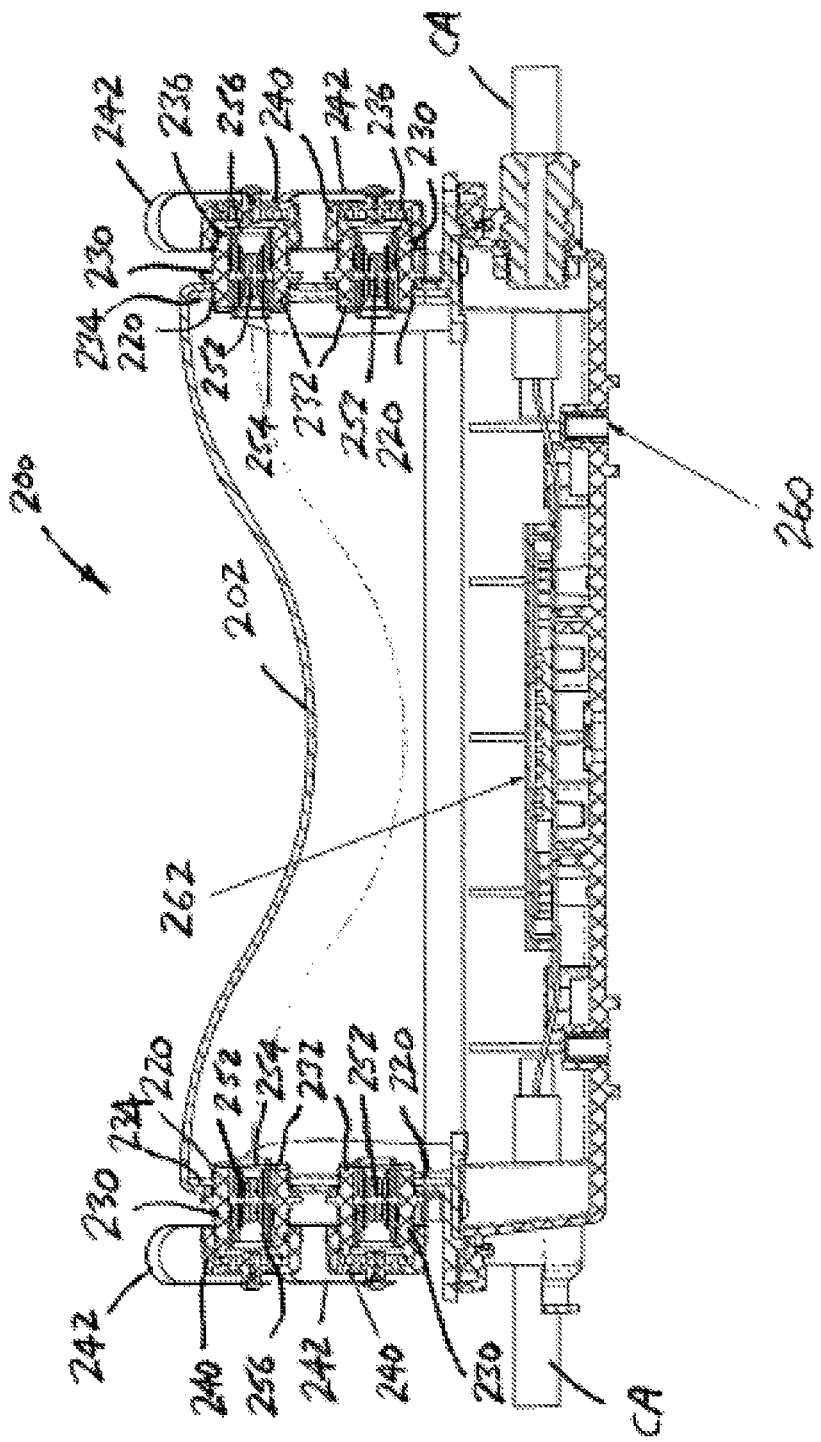

FIBER TAP OPTICAL CROSS CONNECT TERMINAL CLOSURE AND TERMINAL SPLICE CLOSURE

This application claims the priority benefit of U.S. provisional application Ser. No. 62/436,859 filed Dec. 20, 2016, the entire disclosure of which is hereby incorporated herein by reference.

BACKGROUND

This invention relates to a fiber optic cross connect terminal, closure, or housing. More particularly, the invention relates to a housing that includes multiple ports for making desired connections between an optical cable assembly and, for example, 4, 8, or 12 ports where a patch can be completed between the optical cable assembly and one or more drop cables.

It is known to provide a terminal or housing that includes multiple optical ports whereby an optical fiber input(s) (e.g., optical fiber(s) of an optical cable assembly) is(are) joined to or feed(s) optical port outlet(s) in a fiber optic communication network. The optical cable assembly is connected internally within the housing to provide a protected enclosure for the connection. The housing may be mounted on a wall, pole, pedestal, or may be joined to an aerial line.

Manufacturers have recently manufactured and promoted a housing where the outlet ports are arranged at an angle relative to the input cable assembly. More particularly, the include angle between the outlet ports and the cable assembly is between 0° and 90° (or between 90° and 180°). Allegedly, the angular arrangement of the outlet ports is helpful while connecting the drop cables to the housing (see U.S. Pat. No. 7,653,282), however, the angular arrangement is not desired for all applications.

A need exists for an improved arrangement that overcomes one or more of the identified problems and others, while providing an enhanced alternative arrangement with still other features and benefits.

SUMMARY

There is provided a re-enterable fiber optic closure assembly.

A fiber optic closure assembly includes a base having an opening for receiving an incoming fiber optic cable along a longitudinal axis. A perimeter shoulder extending outwardly from a substantially planar surface of the base. A housing is dimensioned for receipt on the base and has a cover that when joined to the base encloses a cavity. The housing includes a substantially planar wall with at least one opening therethrough parallel to the longitudinal axis and through which an associated bulkhead may be mounted to provide operative communication between an optical fiber operatively connected to the incoming fiber optic cable and an outgoing drop line.

The substantially planar wall is substantially perpendicular to the longitudinal axis.

The housing cover includes a sloping surface that transitions from the substantially planar wall toward the base.

The substantially planar wall is located adjacent a first end of the base and axially spaced from a second end of base, and the housing cover includes a first portion that slopes away from the substantially planar wall and toward the second end of the base along a first generally arcuate surface portion.

The first portion of the housing cover terminates approximately midway between the first and second ends of the base.

The housing cover includes a second portion that extends from the first portion and continues to slope toward the second end of the base.

The housing cover includes a second portion that extends from the first portion and continues to slope toward the second end of the base.

The housing has a configuration that has a maximum, first height adjacent a first end of the base and a minimum, second height adjacent a second end of the base, the cover sloping from an edge of the substantially planar wall at the first height toward the second height.

In a second embodiment, the housing includes a second substantially planar wall with at least one opening therethrough parallel to the longitudinal axis and through which an associated bulkhead may be mounted to provide operative communication between the associated optical fiber operatively connected to the incoming fiber optic cable and an associated outgoing drop line.

The housing of the second embodiment has a configuration that has a maximum, first height adjacent first and second ends of the base and a minimum, second height located approximately midway between the first and second ends of the base.

In the second embodiment the cover slopes from edges of the first and second substantially planar wall surfaces at the first height toward the second height.

One of the base and the housing includes a seal that provides a moisture seal therebetween.

The base opening is configured to receive the associated incoming fiber optic cable having either a flattened cross-sectional configuration or a round cross-sectional configuration.

The base includes a clamp for securing at least one strengthening member of the associated incoming fiber optic cable to the base.

At least one fastener removably secures the base to the housing and permits selective re-entry by removing the at least one fastener.

The base has a substantially planar configuration.

A splice tray may be received in the base.

A hinge assembly is provided in one embodiment along adjacent edge portions of the base and housing for hingedly attaching the cover to the housing.

The housing may be configured for different numbers of connector ports, for example common numbers of connector ports for a housing include 4, 8, or 12 outlet connector ports.

The housing is designed to provide a low-profile, and preferably orients the exiting drop cables in parallel relation with the incoming optical cable assembly.

The system simplifies design, installation, and maintenance of a fiber to the home system, for example permitting the ability to connectorize, splice, split, and distribute in one system.

Connectorization can be furnished on most cable styles.

The housing is also adaptable to aerial, duct, or direct bury environments, thereby enhancing the use of the housing in a wide variety of environments for sealed or re-enterable units that permit future service, additions, or repairs.

Still other benefits and advantages of the present disclosure will become more apparent from reading and understanding the following detailed description.

BRIEF DESCRIPTION OF THE DRAWINGS

FIGS. 1-7 are front and rear perspective views, and front, side, rear, top, and bottom plan views of a housing cover with 4 ports.

FIGS. 17 and 18 are front and rear perspective views of an alternative housing base having one input section.

FIG. 19 is a front perspective view of a housing cover with 12 ports, 6 ports extending from each of opposite ends of the housing cover, where the housing cover is received on a splice enclosure.

FIG. 20 is a perspective view of these splice enclosure and housing cover of FIG. 19 in an open position.

FIG. 21 is a cross-sectional view of the splicing closure and housing cover of FIG. 19 in a closed position.

DETAILED DESCRIPTION

Figure 4:
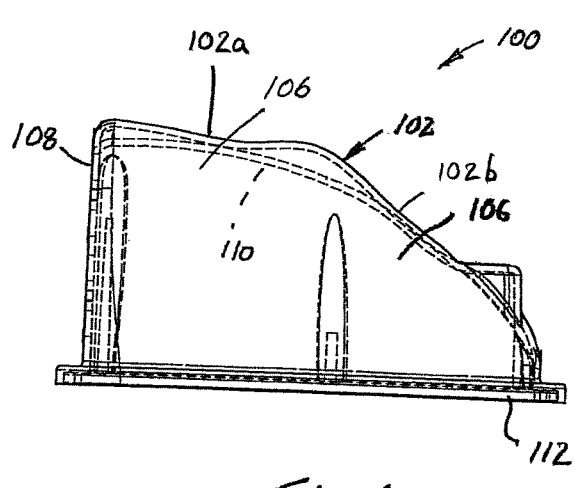
Figure 5:
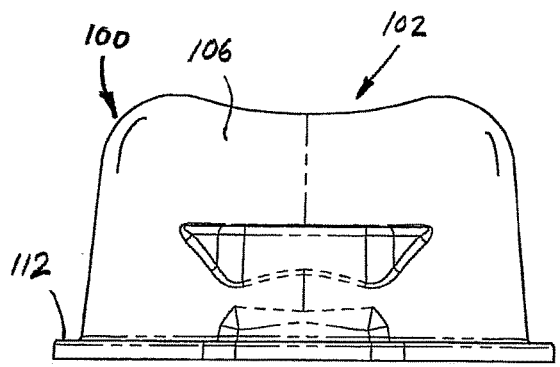
Figure 6:
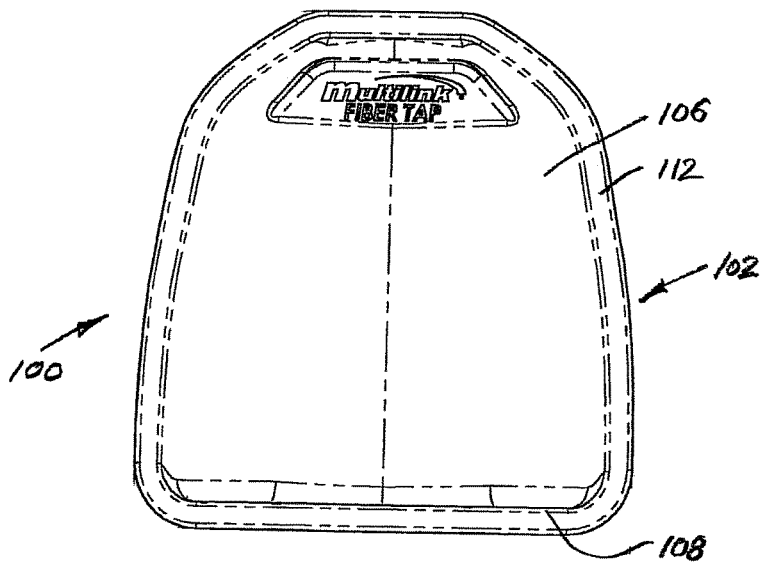
Figure 7:
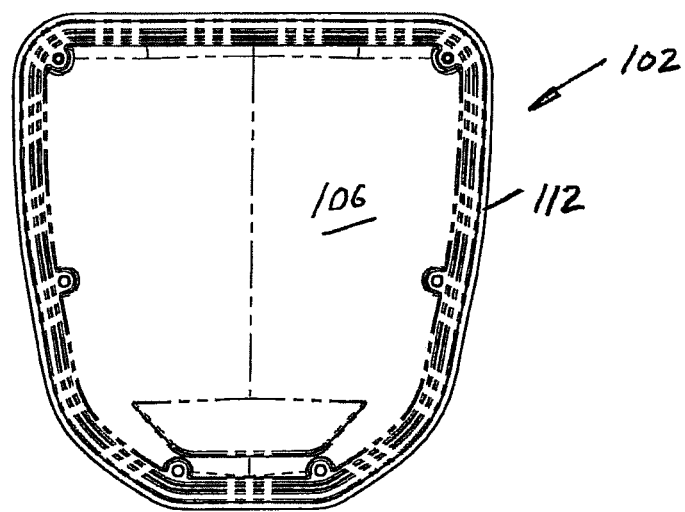

FIGS. 1-18 illustrate a fiber optic terminal, enclosure, or housing 100 (generally referred to herein as a housing). The housing 100 is generally a two-part structure that includes a cover 102 and a base 104. The cover 102 is preferably a one-piece, rigid structure such as a molded plastic that has a generally one-quarter-spherical portion 106, extending from perimeter edges of a substantially planar wall 108 where the spherical portion 106 and wall 108 enclose a hollow cavity 110. The housing cover 102 includes a sloping surface that transitions from the substantially planar wall 108 toward the base 104. The substantially planar wall 108 is located adjacent a first end 104a of the base and axially spaced from a second end 104b of base, and the housing cover 102 includes a first portion 102a that slopes away from the substantially planar wall 108 and toward the second end of the base along a first generally arcuate surface portion. The first portion 102a of the housing cover 102 terminates approximately midway between the first and second ends 104a, 104b of the base 104. A second portion 102b of the housing cover 102 extends from the first portion 102a and continues to slope toward the second end 104b of the base 104. The housing cover 102 has a configuration that has a maximum, first height adjacent a first end 104a of the base 104 and a minimum, second height adjacent a second end 104b of the base, the cover sloping from an edge of the substantially planar wall 108 at the first height toward the second height. A lower, peripheral edge 112 of the housing cover 102 surrounds an opening 114 to the cavity 110, and preferably the peripheral edge 112 is formed by a lip or flange that extends continuously about the opening.

Wall 108 includes a series of openings or ports 120, four of which are shown in FIGS. 1-7 that receive connectors (shown and described below with reference to later figures) for connecting drop lines (not shown). For example, each opening 120 is sufficiently enlarged to receive an annular receptacle 230 (not shown in FIGS. 1-7 but illustrated in FIGS. 20-21, and generally known in the art as bulkhead connections such as is disclosed in U.S. Pat. No. 5,778,122, the details of which are expressly incorporated herein by reference). The receptacle 230 is secured in an opening 120, for example, as a result of an external surface of the receptacle being externally threaded at a first, inner end 232 that extends into the interior of the housing cavity 110 and is held in the opening by an internally threaded locking element 234. Similarly, a second, outer end 236 of the receptacle 230 may likewise be externally threaded to receive an internally threaded cap 240 that is connected by a tether 242 to the receptacle 230. A central opening through the receptacle 230 is dimensioned to receive commercially available connectors 250 of the type that may be push-to-connect, snap fit modular connector arrangements (such as a body/plug with a tab that locks the body/plug and associated jack together), or a wide variety of other modular connectors. Typically, a pre-engineered or pre-terminated fiber end includes a tab so that the fiber end forms the body/plug portion of the modular connector which is inserted into the jack/receiver of the connector 250 that is mounted or received in the receptacle 230 to provide ease of installation or snap-fit connection. More particularly, a snap-fit plug portion of a connector can be inserted or installed to a first, outer end (receiver) 252 of the modular connector 250 after removal of the threaded cap 240, and likewise, the pre-engineered fiber end in the cavity that extends from the optical fiber assembly is preferably snap-fit to the modular connector (receiver) at an inner end 254. The use of a modular connector assembly 250 with snap-fit connections at opposite ends 252, 254 allows both skilled and unskilled technical personnel to easily and securely make a secure fiber connection. Again, one or more of these openings/ports 120 receive the receptacle 230 and modular connector 250 therein, and each port is closed by a cap 240. Of course one skilled in the art will appreciate that other types of modular connectors can be used without departing from the scope and intent of the present disclosure, although desirably those arrangements that allow a simplified push-to-connect assembly are preferred to minimize in-field installation time which reduces cost. The openings in the cover have a dimension that is substantial enough to receive pre-connectorized drop lines or drop cables i.e., the opening is sufficiently enlarged to accommodate push-to-connect connectors and/or jacketed cable assemblies.

The peripheral flange 112 of the cover 102 preferably includes a recess 150 that receives a seal 152 therein. As will be described further below, the seal 152 extends sufficiently outward from the flange recess 150 whereby the seal engages a base of the housing 100 in sealed relation. Alternatively, the seal can be mounted to the base, or otherwise interposed between the mating perimeter portions of the housing and base to seal the interlace between these components and likewise seal the cavity 110.

Figure 8:
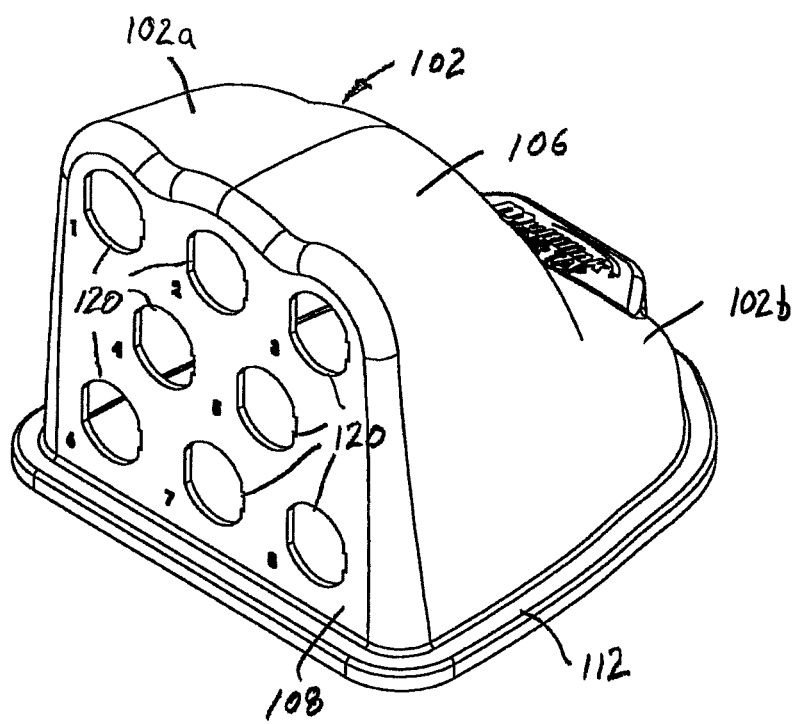
FIG. 8 is a front perspective view of a housing cover with 8 ports.
Figure 9:
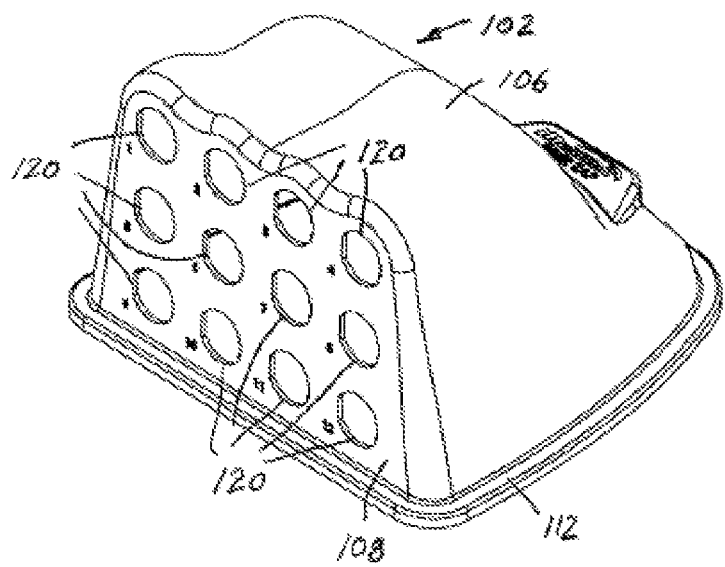
FIG. 9 is a front perspective view of a housing cover with 12 ports.
Figures 10, 11:
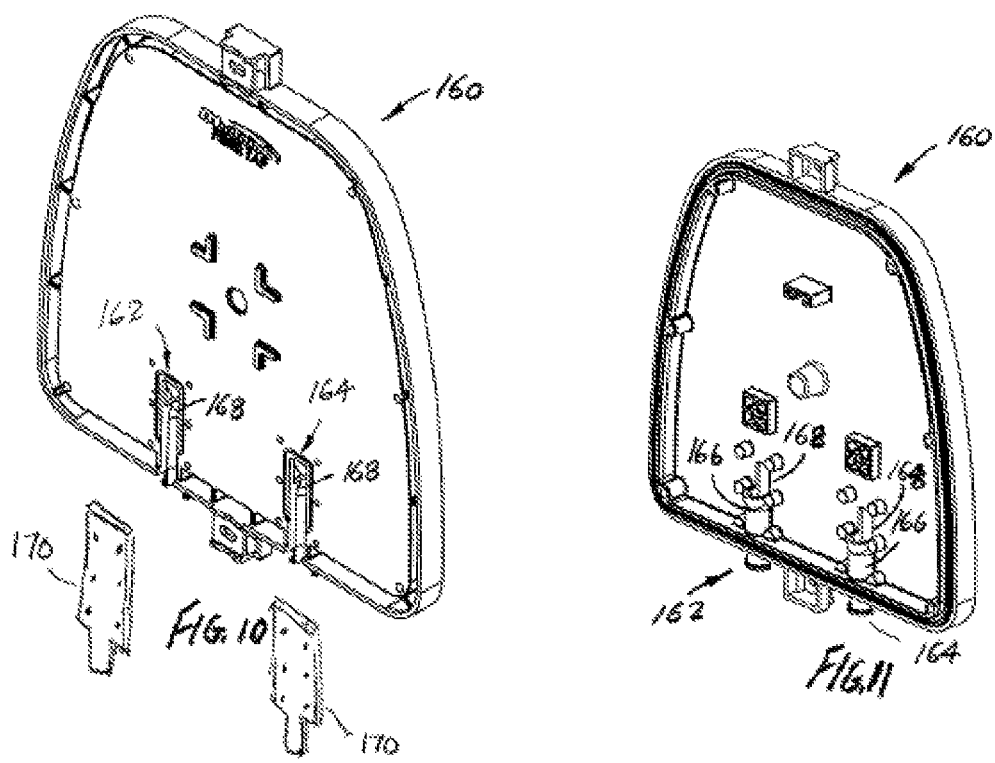
FIGS. 10-16 are front and rear perspective views of the housing base, and top, bottom, front, rear and side views of the housing base, respectively.
Figure 12:
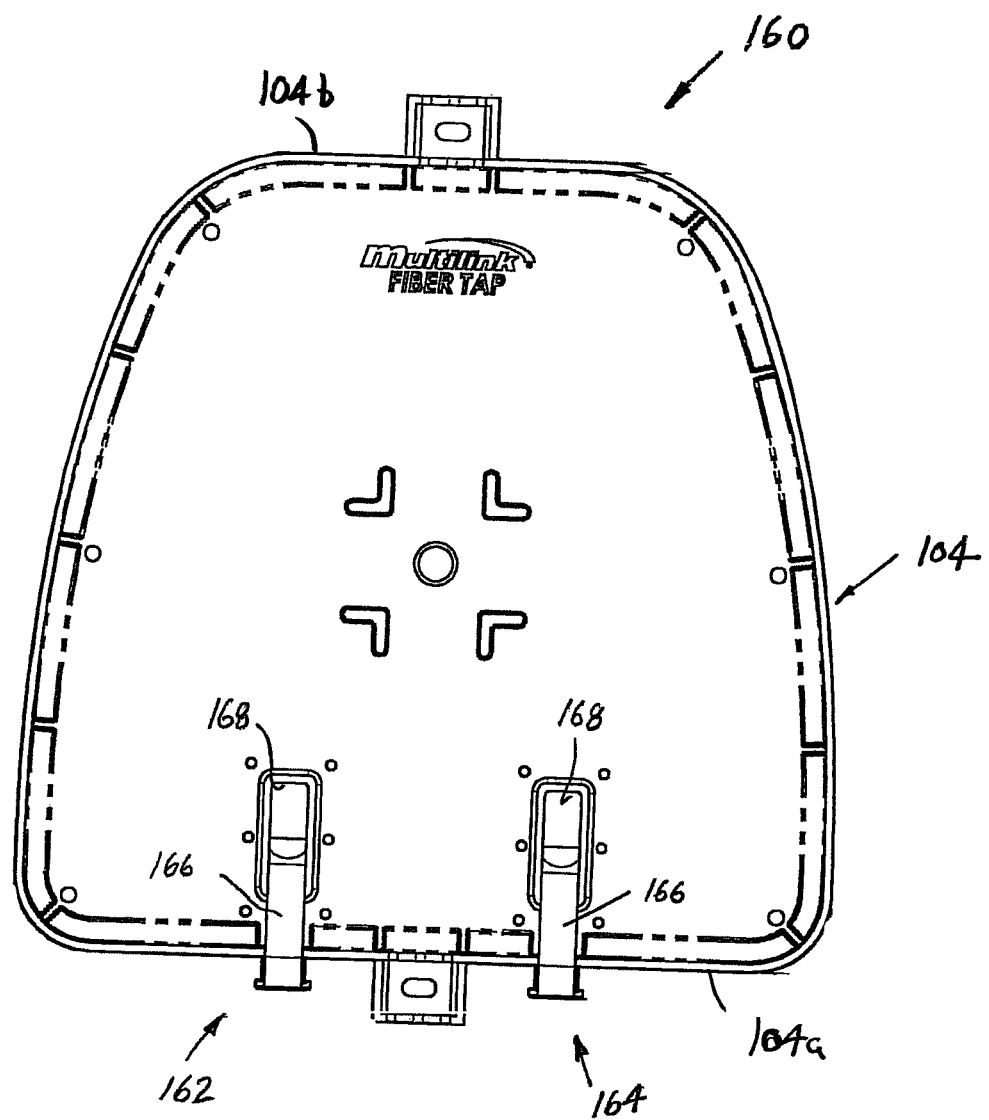
Figure 13:
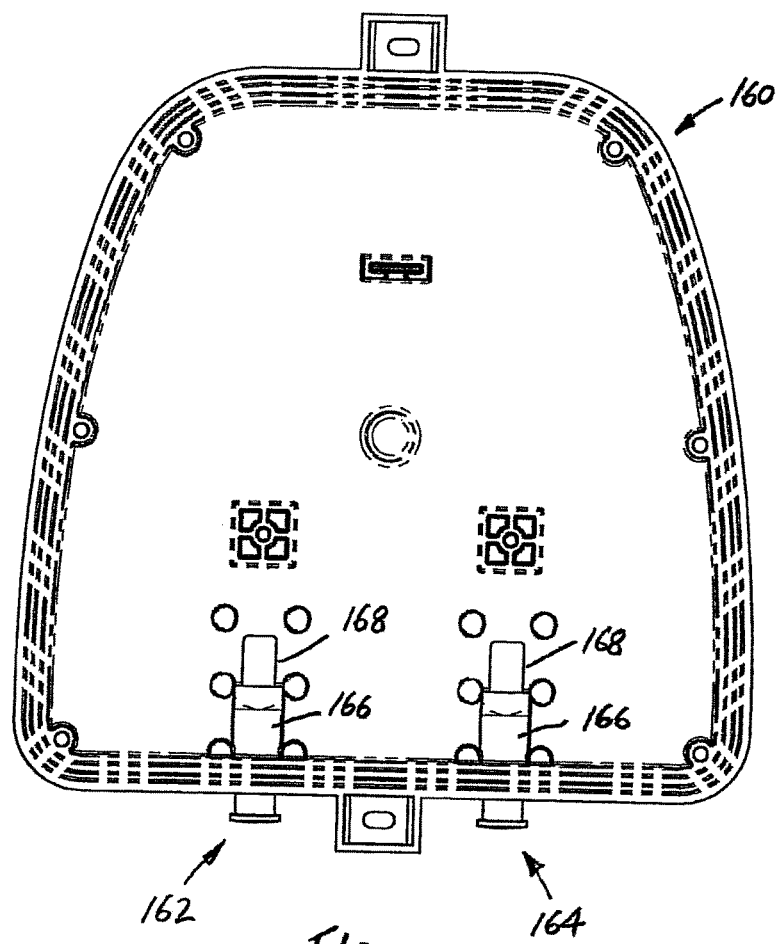
Figure 14:
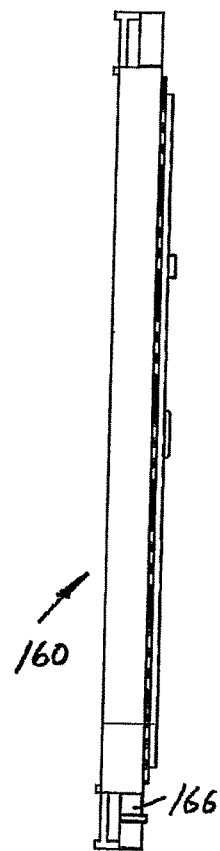
Figure 15:
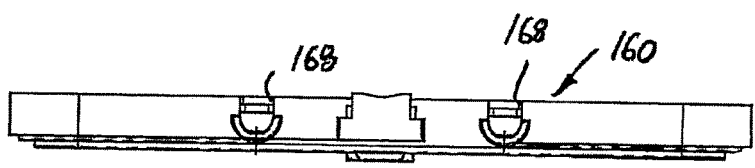
Figure 16:
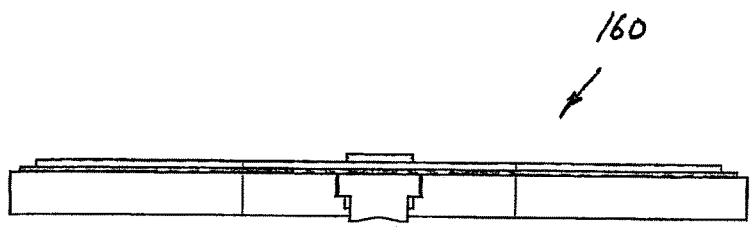

FIGS. 8 and 9 are slightly modified embodiments of the cover 102. The primary distinction relates to the number of openings 120 formed in the wall 108 of the cover 102. For example, in FIG. 8, eight connector openings/ports 120 are provided, while in FIG. 9 twelve openings/ports 120 are provided. The contour of the rigid housing 102 may be slightly altered to accommodate the different number of openings/ports 120 formed in the wall 108; however, the overall structure and function of cover 102 is otherwise similar to that described above in connection with FIGS. 1-7 unless noted otherwise.

FIGS. 10-16 illustrate a first embodiment of a preferred, generally planar base 160 that cooperates with the housing to form the sealed cavity 110 that protects the splice connections contained within the cavity from the external environment. The base 160 has a perimeter shape or conformation that matches that of the peripheral flange 112 of the cover 102. In the illustrated embodiment of FIG. 10, two cable assembly input sections 162, 164 are provided. Particularly, the cable assembly input sections 162, 164 each include a partial sleeve 166 (FIG. 11) that partially covers a recess or opening 168. The partial sleeve 166 has an inner surface that conforms to the outer cylindrical surface or contour of the cable assembly. A removable plate 170 (FIG.

10) on housing base receives round or flat seal arrangement of the input cable. Once the input cable is inserted beneath the partial sleeve 166 into the associated recess 162, 164, a plate 170 is secured to the base to secure the perimeter of the cable and resist pullout forces. This arrangement provides for entry of the cable into the housing 100 in a direction that is in substantially the same plane as the base 160. As evident from FIGS. 1-8, the wall 108 and thus the openings 120 through the wall, are substantially perpendicular to the planar base 160 so that the drop lines exiting the housing 100 are parallel to the direction of the inlet cable assembly. This provides for a low-profile housing while still allowing ready access to the receptacle 230, threaded caps 240, connectors 250, etc., whereby the individual drop cables can be easily and effectively secured to provide a reliable fiber connection. The overall footprint of the housing is reduced, and there is a limited prospect of bending of the drop lines as the drop lines proceed away from the housing. The simplified push-to-connect assembly minimizes in-field installation time and does not require a high amount of skill to complete the connection process. Thus, in wall mount, pedestal mount, aerial mount, or pole mount arrangements, the wall 108 and openings/ports 120 are oriented so that the drop lines advantageously extend parallel to the input cable assembly. Moreover, cable company personnel enjoy the flexibility associated with making the connections in the field, or the ability to accommodate pre-connectorized lines.

FIGS. 17 and 18 are front and rear perspective views of an alternative housing base. As is evident, the structure of the housing base is substantially similar to that shown and described above in connection with FIGS. 10-16 so that similar reference numerals are used to describe like components. The primary distinction is that only one having one inlet cable assembly is provided to the housing.

In FIGS. 19-21, a modified housing 200 is shown. In this embodiment, like components will be described by like reference numerals in the 200 series, i.e., housing 100 in FIGS. 1-10 will now be referred to as housing 200 in FIGS. 19-21. The housing cover 202 includes a sloping surface that transitions from the substantially planar walls 208, 208' toward the base 204. The substantially planar walls 208, 208' are located adjacent a first end 204a and a second end 204b of the base 204, respectively, and axially spaced from one another, and the housing cover 202 includes first portions 202a that slope away from the substantially planar walls 208, 208' and toward the central or middle of the base 204 along a first generally arcuate surface portion. The first portions 202a of the housing cover 202 merge into one another terminate approximately midway between the first and second ends 204a, 204b of the base 204. Thus, the housing cover 202 has a configuration that has a maximum, first height adjacent the first and second ends 204a, 204b of the base 204 and a minimum, second height adjacent a central portion of the base, the cover sloping from an upper edge of each of the substantially planar walls 208, 208' at the first height toward the second height.

The modified housing 200 is provided with twelve openings/ports 220 in the cover 202. More particularly, six of the openings/ports 220 are provided in each of opposite ends of the housing cover 202. Again, however, the opening/ports 220 are provided in an end wall 208 that is substantially perpendicular to the direction of the input cable assembly provided in a lower portion or base 260 of the housing 200. It is also evident that the base 260 of the housing 200 is not a substantially planar member as in the earlier described embodiments; rather, the housing is a more conventional lower tray that has a depth forming a portion of an interior cavity that defines a splice enclosure. For example, the splice enclosure may include a splice tray 262 securely mounted to bosses on the interior of the lower tray 260. Inlet cable assemblies CA (four of which are shown in FIGS. 19-21) pass-through cabling grommets 280 provided in the end wall portions of the splice enclosure. This sealingly grips an exterior surface of the cable assembly to limit the ingress of moisture or water from the external environment into the housing cavity. Splices can be formed as desired and is well known in the art in the base 260.

On the other hand, individual fibers extend from the splice area of the lower tray 260, and extends toward the openings/ports 220. The openings/ports 220 receive connectors (see FIG. 21) for connecting drop lines (not shown). Each opening 220 is sufficiently enlarged to receive an annular receptacle 230 where the receptacle 230 is secured in an opening. An external surface of the receptacle 230 is preferably externally threaded at a first, inner end 232 that extends into the interior of the housing cavity 210 and is held in the opening 220 by an internally threaded locking element 234. Similarly, a second, outer end 236 of the receptacle 230 may likewise be externally threaded to receive an internally threaded cap 240 that is connected by a tether 242 to the receptacle 230. A central opening through the receptacle 230 is dimensioned to receive commercially available connectors 250 of the type that may be push-to-connect, snap fit modular connector arrangements (such as a body/plug with a tab that locks the body/plug and associated jack together). Typically, a pre-engineered or pre-terminated fiber end includes a tab so that the fiber end forms the body/plug portion of the modular connector which is inserted into the jack/receiver of the connector 250 that is mounted or received in the receptacle 230 to provide ease of installation or snap-fit connection. More particularly, a snap-fit plug portion of a connector can be inserted or installed to a first, outer end (receiver) 252 of the modular connector 250 after removal of the threaded cap 240, and likewise, the pre-engineered fiber end in the cavity that extends from the optical fiber assembly is preferably snap-fit to the modular connector (receiver) at an inner end 254. The use of a modular connector assembly 250 with snap-fit connections at opposite ends 252, 254 allows both skilled and unskilled technical personnel to easily and securely make a secure fiber connection. Again, one or more of these openings/ports 220 receive the receptacle 230 and modular connector 250 therein, and each port is closed by a cap 240. Of course one skilled in the art will appreciate that other types of modular connectors can be used without departing from the scope and intent of the present disclosure, although desirably those arrangements that allow a simplified push-to-connect assembly are preferred to minimize in-field installation time which reduces cost. The openings in the cover have a dimension that is substantial enough to receive pre-connectorized drop cables i.e., the opening is sufficiently enlarged to accommodate push-to-connect connectors and/or jacketed cable assemblies. As a result, this design provides for the drop cables to extend the generally parallel relation to the inlet cable assemblies, or stated another way the end walls 208 are substantially perpendicular to the lodge to direction of the inlet cable assemblies.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

It is claimed:

1. A fiber optic closure assembly comprising:
a base having a planar surface and a perimeter shoulder extending outwardly from and substantially perpendicular to the planar surface;
a one-piece rigid plastic cover dimensioned for receipt on the base, the cover when joined to the base enclosing a cavity, the cover having a first end and a second end that is located in axially spaced relation along the longitudinal axis from the first end, the first end having a substantially planar wall with at least one opening therethrough parallel to the longitudinal axis configured to receive a modular connector associated with an outgoing drop line, wherein the outgoing drop line is mounted to provide operative communication with an associated optical fiber operatively connected to the incoming fiber optic cable;
wherein the substantially planar wall of the cover is substantially perpendicular to the planar surface of the base; and
wherein the housing cover includes a surface that slopes away from a top edge of the substantially planar wall defining a maximum, first height at the first end of the housing cover toward base and a minimum, second height at the second end of the cover.

2. The fiber optic closure assembly of claim 1 wherein at least one of the base or the cover includes a seal about an outer perimeter of the base or cover that provides a moisture seal therebetween.

3. The fiber optic closure assembly of claim 2 wherein the seal is mounted to the cover.

4. The fiber optic closure assembly of claim 3 wherein the housing includes a recess that receives the seal therein and sealingly engages the base when the base is joined to the housing.

5. The fiber optic closure assembly of claim 1 wherein the cover includes a first portion that begins at and slopes away from the top edge of the substantially planar wall and toward the second end of the base along a first generally arcuate surface portion.

6. The fiber optic closure assembly of claim 1 wherein the base opening is configured to receive the associated incoming fiber optic cable having either a flattened cross-sectional configuration or a round cross-sectional configuration.

7. The fiber optic closure assembly of claim 1 wherein the base includes a clamp for securing at least one strengthening member of the associated incoming fiber optic cable to the base.

8. The fiber optic closure assembly of claim 1 further comprising at least one fastener for removably securing the base to the housing and permitting selective re-entry by removing the at least one fastener.

9. The fiber optic closure assembly of claim 1 wherein the base has a substantially planar configuration.

10. The fiber optic closure assembly of claim 1 further comprising a splice tray received in the base.

11. The fiber optic closure assembly of claim 1 further comprising a hinge assembly along adjacent edge portions of the base and housing for hingedly attaching the housing cover to the base.

12. The fiber optic closure assembly of claim 1 wherein the cover includes a second substantially planar wall with at least one opening therethrough parallel to the longitudinal axis and through which an associated bulkhead may be mounted to provide operative communication between the associated optical fiber operatively connected to the incoming fiber optic cable and an associated outgoing drop line.

* * * * *